March 24, 1959    F. HILDEBRANDT    2,879,267
PROCESS FOR PRODUCING VISCOSE SOLUTION
Filed Dec. 20, 1955
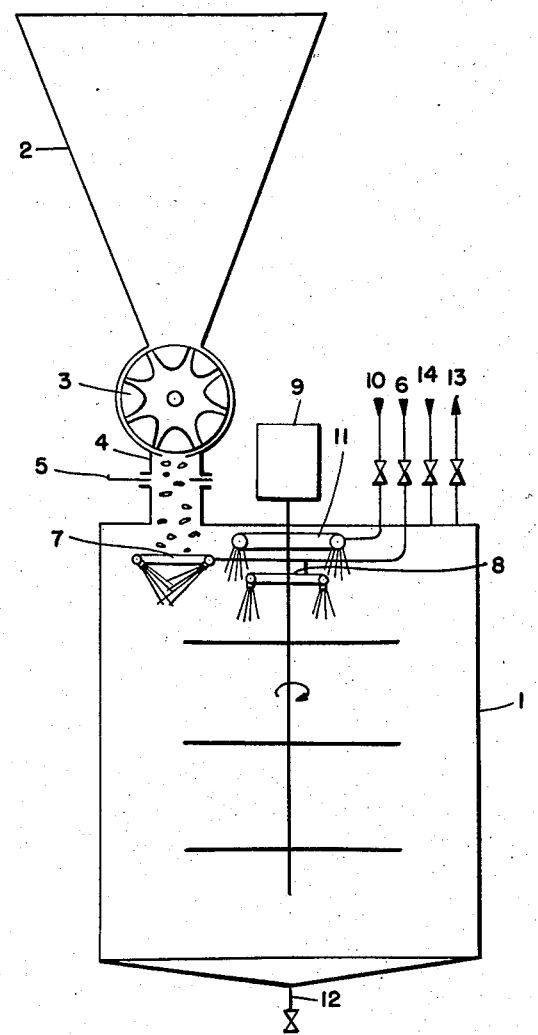
INVENTOR:
FRIEDRICH HILDEBRANDT
BY
ATT'YS United States Patent Office 2,879,267
Patented Mar. 24, 1959

2,879,267

PROCESS FOR PRODUCING VISCOSE SOLUTION

Friedrich Hildebrandt, Kassel-Bettenhausen, Germany, assignor to Spinnfaser Aktiengesellschaft, Kassel-Bettenhausen, Germany Application December 20, 1955, Serial No. 554,351

Claims priority, application Germany December 24, 1954

2 Claims. (Cl. 260—218)

This invention relates to the production of viscose solution in the manufacture of regenerated cellulose or rayon by the viscose process and, particularly, to the process commencing with the production of cellulose xanthogenate.

Alkali cellulose and carbon disulfide are reacted in a heterogeneous system requiring apparatus which provides very intimate and uniform contact of the reactants. Only in such a manner is cellulose xanthogenate obtained which dissolves satisfactorily in aqueous sodium hydroxide solution and consequently produces well filterable viscose solution.

In the barratte process, the alkali cellulose crumbs are tumbled in a rotating drum in an atmosphere of carbon disulfide. Under normal conditions, the xanthogenate produced in this process is satisfactory, but the process is limited to the production of relatively small amounts of xanthogenate. Consequently, for larger production, so-called xanthogenate kneaders have been used for the sulfidization and dissolution. In the kneader, the carbon disulfide first contacts only the top layers of the alkali cellulose, and it is mixed with the remaining alkali cellulose only gradually by stirring and kneading. This unfavorably affects the uniformity of the xanthogenate.

Various efforts have been made to overcome these difficulties. It has been proposed to first add only one-third of the required carbon disulfide quantity to the alkali cellulose in a xanthogenate kneader under vacuum, stirring vigorously, as a presulfidization step. The remaining carbon disulfide is introduced thereafter as a liquid, and the sulfidization is completed.

Special apparatus and corresponding methods have been developed in efforts to carry out the sulfidization in the desired manner. For example, the alkali cellulose in the form of crumbs or lumps is introduced into a stirring zone, and a measured quantity of carbon disulfide is then introduced through a nozzle. The material is vigorously stirred with mixing blades at the same time. The mixture then enters into a rest zone in which the chemical reaction is completed without stirring.

A tower-like apparatus and corresponding method have been devised wherein the alkali cellulose is introduced from above into a screw conveyor which fits tightly into the inner space of a tower. The carbon disulfide is blown in from the side. This is to assure that by the time the material reaches the lower end of the tower or the screw conveyor, the alkali cellulose and the carbon disulfide are completely mixed and xanthogenate formation is complete. The sulfidization is carried out in a continuous operation in this manner.

It has further been proposed to influence the formation of the xanthogenate by high frequency sound waves. Liquid carbon disulfide is brought together with the alkali cellulose crumbs, and the mixture is subjected to the sound waves at the same time.

The foregoing processes do not solve the problems satisfactorily, because they do not produce truly well filterable viscose solutions when the cellulose xanthogenate is prepared in large quantities, and they suffer from other disadvantages.

It is therefore an object of the invention to provide a new and improved process for the production of viscose solution and, in particular, a process which produces a solution which filters very well.

Another object is to provide an improved process for producing the cellulose xanthogenate.

A further object is to provide a process for producing cellulose xanthogenate which is especially suitable for the production of large quantities of readily soluble xanthogenate and of filterable viscose solution.

An additional object is to provide a process which provides intimate and uniform mixing of the reactants in the production of cellulose xanthogenate.

Another object is to provide a rapid process for the production of the xanthogenate and the viscose solution.

An additional object is to provide a process wherein the xanthogenate is completely produced in one reaction zone, where the viscose solution is also advantageously produced.

A further object is to provide a process which may be carried out without need for special apparatus.

Another object is to provide a simple, economical and reliable process accomplishing the foregoing objects of the invention. These and other objects and advantages of the invention will be apparent on reference to the specification taken in conjunction with the attached drawing, which in a schematic elevational representation of apparatus for carrying out the invention and which illustrates one embodiment of the new process or method.

It has now been found in accordance with the invention that viscose solution is prepared in a much improved manner when the alkali cellulose is sulfidized by intimately contacting alkali cellulose flakes with carbon disulfide. In particular, a loose stream of alkali cellulose flakes is contacted, preferably sprayed, with carbon disulfide.

Alkali cellulose and carbon disulfide are simultaneously introduced in streams into a reaction zone, where they intimately and uniformly mix and react. The alkali cellulose is introduced and intimately contacted with the carbon disulfide in incremental fashion, small quantities of the alkali cellulose being substantially continuously contacted with the corresponding quantities of carbon disulfide required for conversion of the alkali cellulose. The alkali cellulose flakes are preferably introduced into the reaction zone in a loose stream in gravity flow, and the flakes are sprayed with liquid carbon disulfide as they enter the zone.

In a preferred method of operation, measured quantities of alkali cellulose flakes and carbon disulfide are introduced separately to a reaction zone at the same time, in continuous flow or as continuous streams. The flakes entering the zone are sprayed with carbon disulfide as they enter the zone and at a rate corresponding to the flow rate of the flakes, until each quantity of reactant has been completely introduced. The quantities of reactants thus mixed are collected in the zone, and the sulfidization or xanthogenation of the alkali cellulose is completed in the zone. In a further advantageous method, the viscose solution is also produced in the reaction zone, by introducing an aqueous alkali solution into the zone.

In contrast to the prior processes, the new process furnishes intimate contact between the loose alkali cellulose flakes and the carbon disulfide, which results in rapid uniform sulfidization and conversion into sodium hydroxide-dissoluble condition. In the prior processes, the sulfidization was non-uniform and incomplete, a long after-sulfidization period was required, and the viscose solutions did not filter well. Thus, after the alkali cellulose sheets were shredded or opened with suitable devices, the resulting flakes or fibers were previously transferred to mechanical kneading or stirring machines. The kneaders or stirrers caused agglomeration of the flakes into large agglomerates, which were contacted with the carbon disulfide. In the present process, these flakes are intimately contacted with carbon disulfide while still loose and fluffy.

When carbon disulfide acts on the agglomerates of flakes and also when acting on alkali cellulose lumps or crumbs, a sticky outer layer of cellulose xanthogenate forms immediately, which hinders the penetration of the carbon disulfide into the interior of the agglomerate or lump. The interior portions are sulfidized only to a small degree, and they can only be brought to dissoluble condition during the after-sulfidization. Under such conditions, a long after-sulfidization period and very intensive mechanical shredding are required.

One form of apparatus for carrying out the new process is illustrated in the drawing. A reaction vessel 1 communicates with or is disposed beneath a silo, bin or hopper, not shown, which contains the alkali cellulose flakes and discharges into the vessel through a funnel 2. The funnel discharges into a chambered or measuring star wheel or valve 3, which rotates and conveys or discharges the alkali cellulose into a conduit or tube 4. The conduit is provided with a slide valve 5 which when open permits the alkali cellulose to fall freely in gravity flow into the top zone of the reaction vessel. A very loose or relatively widely dispersed stream of alkali cellulose flakes is thus introduced into the reaction zone defined by the reaction vessel 1. For the complete and uniform mixing and reacting of the reactants, it is necessary that the alkali cellulose be in the form of flakes or the like, and crumbs or lumps are unsuitable for this manner of operation, for the reasons given above.

As the alkali cellulose flakes enter and descend into the reaction zone, they are rapidly, intimately and completely sprayed incrementally with corresponding reaction quantities of liquid carbon disulfide introduced through a line or conduit 6 and then through spray rings or nozzles 7 and 8, which are located near or proximate to the alkali cellulose entrance. The rotation of the star wheel 3 and the flow rate of the carbon disulfide are regulated in such a manner that corresponding quantities are continuously introduced, and the total charge of each reactant is supplied in the same period of time. The resulting product of intimately mixing alkali cellulose flakes and carbon disulfide undergoing reaction descends in the vessel 1.

The resulting product can be stirred when required, and this is effected by an agitator 9. Stirring is continued only so long as it does not affect the loose, crumbly structure of the cellulose xanthogenate. After the measured quantities of reactants have been completely charged, the sulfidization or xanthogenation is completed in the reaction zone, preferably by slowly stirring the reaction mixture while controlling the temperature by jacket cooling, not shown. The reaction time or stirring time and the temperature are dependent variables, the time increasing with decreasing temperature, and vice versa. The preferred reaction temperature is about 26° C. to 33° C., corresponding to a stirring time of about 60 to 40 minutes.

When the reaction is complete, the xanthogenate can be discharged from the reaction vessel 1 and dissolved in aqueous sodium hydroxide solution in the usual manner. However, operation according to the present invention, under atmospheric pressure and in a nitrogen atmosphere, as will appear, renders it possible to condense the carbon disulfide vapors in the apparatus while stirring with the sodium hydroxide solution, and thus to complete the after-sulfidization and to carry out production of the viscose solution to advantage in the same apparatus and reaction zone.

In this connection, it should be noted that the hydroxyl groups of the cellulose are not all equally reactive with the carbon disulfide, as is known. Therefore, at the start of sulfidization, only part of the hydroxyl groups react, forming xanthogenate. Immediately after the reactants come in contact, the ripening process commences, in which carbon disulfide is released. This regenerated carbon disulfide and the carbon disulfide still present in the reaction mixture react with the less reactive cellulose hydroxyl groups. This phenomenon is referred to as after-sulfidization. It commences during the mixing of the cellulose and carbon disulfide and is completed during the formation of the viscose solution, when the carbon disulfide also reacts with the sodium hydroxide, forming trithiocarbonate. In the new process, the after-sulfidization may be completed and the viscose solution produced in the same reaction zone.

Consequently, in the preferred method of operation, the usual amount of aqueous sodium hydroxide solution is introduced into the reaction zone through a transfer line or conduit 10 and a spray ring or series of nozzles 11 located at the top of the vessel 1. It is possible to precharge a certain quantity of the sodium hydroxide solution. In this case, it is especially important that the alkali cellulose be xanthogenated as completely as possible during its passage through the carbon disulfide zone. As described above, carbon disulfide is present in the reaction zone, and no additional introduction thereof is necessary for completion of the after-sulfidization during the formation of the viscose solution. The mixture is stirred by means of the agitator 9 until solution is complete, after which the viscose solution is discharged at the base of the reaction vessel through a conduit or line 12.

Air must be excluded from the apparatus during the sulfidization and also irregularities in charging the alkali cellulose must be avoided, so that it is necessary to employ a silo or hopper together with a construction like that illustrated. The sulfidization is carried out in an atmosphere of nitrogen and/or carbon disulfide. If pneumatic alkali cellulose conveyance is used, the silo is constructed as a diffusor from which the compressed air escapes. If desirable or necessary, the silo may contain apparatus which moves the alkali cellulose, such as a screw conveyor.

The star wheel 3 closes off the interior of the reaction vessel 1 from the silo and the hopper 2 as tightly as possible, to exclude air. When the alkali cellulose is completely charged, the vessel is further sealed off from the outside atmosphere by closing the slide valve 5.

The reaction vessel is also provided with a line 13 to a source of vacuum, not shown, and an inert gas line 14 connected to a supply of nitrogen, also not shown. The vessel may also be vented directly to the atmosphere through the line 13. In the operation, the reaction vessel 1 is first evacuated through the vacuum line 13, and it is subsequently returned to atmospheric pressure by the introduction of nitrogen through the inert gas line 14 and of small quantities of carbon disulfide through the carbon disulfide conduit 6 and the sprayers 7 and 8.

The following example given with reference to the drawing is furnished to illustrate the invention, and it is to be understood that the invention is not limited thereto nor to the specific procedures and conditions set forth therein.

*Example*

A reaction vessel 1 having a capacity of about 15 cubic meters is evacuated through the vacuum line 13 while the slide valve 5 is closed. An atmosphere of nitrogen and carbon disulfide is provided by introducing nitrogen through the inert gas line 14 and small amounts of carbon disulfide through the conduit 6 and the sprayers 7 and 8, to return the pressure to atmospheric.

3.375 kilograms of alkali cellulose are continuously introduced over a period of time from a silo into the funnel 2. With the slide valve 5 open, the alkali cellulose is at about the same time continuously introduced in a uniform stream into the reaction vessel 1 by rotation of the star wheel 3. At the same time, 325 liters of carbon disulfide, the quantity required for xanthogenation of the alkali cellulose, is sprayed in continuous streams from the sprayers 7 and 8. Both reactants are introduced within about 14 minutes.

The atmosphere displaced by the reactants escapes through the conduit 13, which is vented to atmospheric pressure, and it is cooled to condense the carbon disulfide content. During the introduction of the reactants, the reaction product is stirred by the agitator 9 at 20 r.p.m.

When the reactants are completely charged, the slide valve 5 and the vent conduit 13, as well as all other openings to the vessel 1, are closed, and the xanthogenation is completed by stirring the reaction mass for 26 minutes at the same speed while controlling the temperature by jacket cooling at about 32-33° C. The cellulose xanthogenate produced is light yellow, has a loose, crumbly consistency, and is readily soluble.

Dilute aqueous sodium hydroxide solution of about 2.7 to 2.8% concentration is next charged to the reaction vessel 1 through the supply line 10 and the sprayer 11. The alkali solution is added in a quantity of about three times the weight of the alkali cellulose, in portions over a period of about 20 to 40 minutes. The sodium hydroxide solution is at a temperature such as to bring the mixture to the temperature desired for dissolution. Thus, if the dissolution is to be carried out between 18° C. and 22° C., the sodium hydroxide solution has a temperature of about 6° C. to 10° C., the xanthogenate being at 32° C. as described.

After stirring by means of the agitator 9, the xanthogenate particles dissolve well to produce the viscose solution, which is discharged through the conduit 12 at the base of the vessel. The viscose solution contains 8.6% cellulose and 5.8% NaOH. This solution is then after-dissolved for about one hour under stirring and also under conditions which exert a rubbing and pulverizing action.

The improvements obtained in filtrability of the resulting viscose solution are remarkable, the filtration being from one to three times better than in other processes. For example, only about 350 undissolved particles are contained in one cubic centimeter of the viscose solution, as compared to 600 particles in a common kneader viscose. The filter linings, which become clogged with particles, need be replaced much less frequently.

Another advantage achieved with the new process is that viscose of the same gamma value is obtained with a smaller quantity of carbon disulfide. A gamma value of 52 is obtained with a carbon disulfide charge of 35%, as compared to 37% before.

The invention thus provides a process which overcomes prior disadvantages in the production of viscose solution and is especially advantageous in producing a readily soluble cellulose xanthogenate and a well filterable viscose solution. The production of cellulose xanthogenate according to the invention is rapidly and reliably carried out to produce a uniform well reacted product, and the quantity of carbon disulfide required is reduced. The process is particularly suited for production on a relatively large scale. The sulfidization as well as the preparation of the viscose solution can be carried out in a single zone, and the apparatus requirements are simple.

The invention is hereby claimed as follows:

1. In a process for producing viscose solution, the improvement which comprises sulfidizing alkali cellulose by introducing a measured quantity of alkali cellulose flakes into a reaction zone in the form of a loose stream in free gravity fall, spraying said flakes with a corresponding measured reaction quantity of liquid carbon disulfide as they fall in said zone and at a rate corresponding to the flow rate of said flakes, whereby said measured quantities are introduced into said zone over the same period of time, collecting in said zone the reactants thus mixed in said quantities, and completing the sulfidization of the alkali cellulose in said zone.

2. In a process for producing viscose solution, the improvement which comprises sulfidizing alkali cellulose by introducing a measured quantity of alkali cellulose flakes into a reaction zone in the form of a loose stream in free gravity fall, spraying said flakes with a corresponding measured reaction quantity of liquid carbon disulfide as they fall in said zone and at a rate corresponding to the flow rate of said flakes, whereby said measured quantities are introduced into said zone over the same period of time, collecting in said zone the reactants thus mixed in said quantities, completing the sulfidization of the alkali cellulose in said zone, introducing an aqueous sodium hydroxide solution into said zone, and producing viscose solution therein.

References Cited in the file of this patent

UNITED STATES PATENTS

| | | |
|---|---|---|
| 1,842,688 | Richter | Jan. 26, 1932 |
| 2,122,519 | Dokkum | July 5, 1938 |
| 2,510,984 | Kulp et al. | June 13, 1950 |
| 2,530,403 | Seaman | Nov. 21, 1950 |

FOREIGN PATENTS

| | | |
|---|---|---|
| 522,083 | Great Britain | June 7, 1940 |
| 696,411 | France | Oct. 14, 1930 |